F. SCHIMMEL.
SHOCK ABSORBER.
APPLICATION FILED MAY 23, 1912.

1,052,013.

Patented Feb. 4, 1913.

WITNESSES
M. E. McLean
Emma Meeske

Fridolin Schimmel
INVENTOR

BY Edw. Paulwinkle
ATTORNEY

UNITED STATES PATENT OFFICE.

FRIDOLIN SCHIMMEL, OF FARIBAULT, MINNESOTA, ASSIGNOR TO SCHIMMEL, REID & COMPANY, OF FARIBAULT, MINNESOTA, A CORPORATION OF MINNESOTA.

SHOCK-ABSORBER.

1,052,013.  Specification of Letters Patent.  Patented Feb. 4, 1913.

Application filed May 23, 1912. Serial No. 699,306.

*To all whom it may concern:*

Be it known that I, FRIDOLIN SCHIMMEL, a citizen of the United States, residing at Faribault, Rice county, State of Minnesota, have invented certain new and useful Improvements in Shock-Absorbers, of which the following is a specification, reference being had therein to the accompanying drawing.

This invention relates to that class of shock absorbers in which mechanism is arranged to allow relatively movable bodies, as vehicle body and vehicle axle, to move toward or away from each other with a minimum shock or jar and has for its object the production of a shock absorber which will present a relatively increasing retardation in its movement as the shock varies.

My shock absorber is of a type commonly known as the resistance toggle type in which one arm of the toggle is pivoted to the car frame, or other part of the car body, and the other arm to the axle, or similar part, the joint being so constructed that the friction between the rotating members is varied from a predetermined intensity to a comparatively greater intensity, depending upon the degree of rotation.

With these and other objects in view, the invention consists of certain novel features of construction, as will be more fully described and particularly pointed out in the claim.

Figure 1:
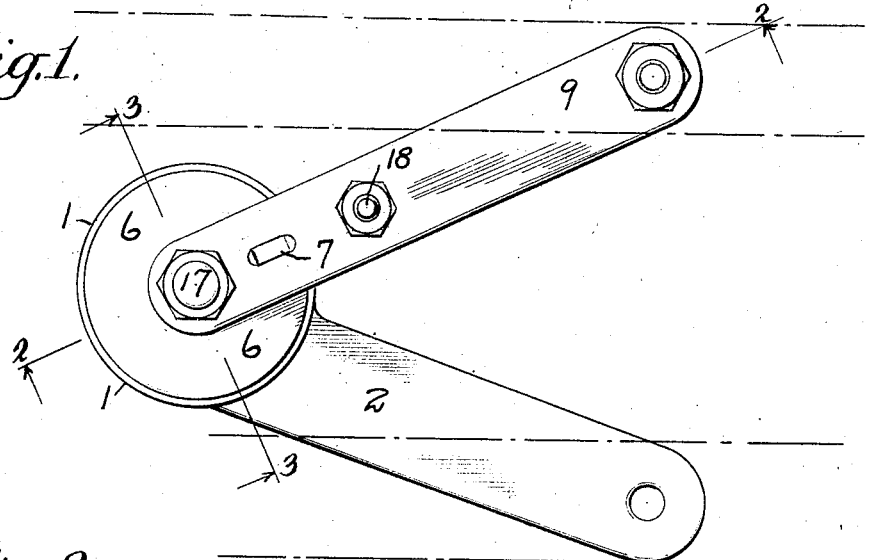
Figure 2:
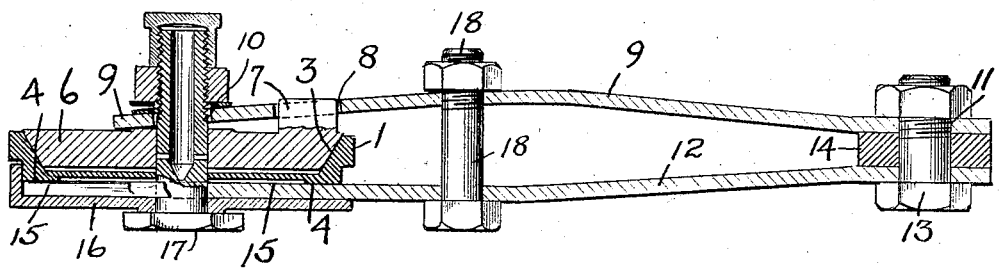
Figure 3:
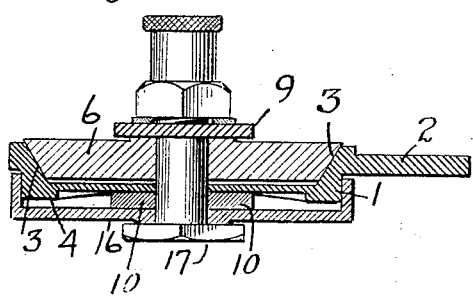
Figure 4:
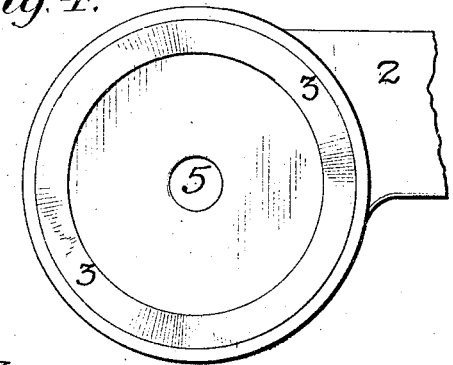
Figure 5:
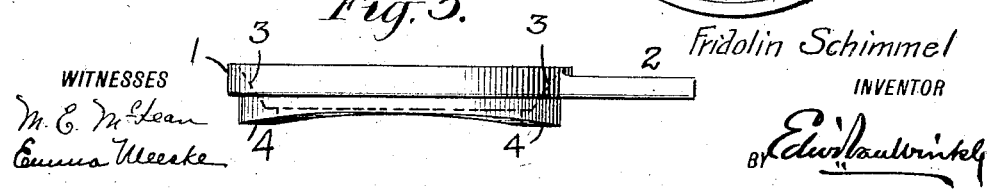

In the accompanying one sheet of drawings, Figure 1 is a side elevation showing the shock absorber connected in position between two relatively movable members of an automobile, illustrated by broken lines. Fig. 2. is a section of the two-part arm of the toggle along the line 2 2 Fig. 1. Fig. 3. is an elevation in part section showing the friction members along the line 3 3 Fig. 1. Figs. 4 and 5. show details of the conical friction member provided with the cam for regulating the pressure between the friction surfaces.

My shock absorber may be applied in various different ways between the spring connected parts or members, but for the purpose of illustration, it is shown as pivotally connected between the upper and lower members of an ordinary vehicle spring, being indicated by the broken lines in Fig. 1.

My shock absorber comprises a friction hub 1, provided with an extension arm 2, a conical recess 3 on one side of the hub, and a cam face 4 on the opposite side, and a central hole 5. Adapted to pivotedly turn in the conical recess 3 I provide a conical member 6 having a projection 7 adapted to engage a slot 8 in the spring arm 9. The arm 9 is also provided with hole 10 which is coaxial with hole 5 of the hub 1. On the end opposite the hole 10 is a similar hole 11 providing a means for pivotedly connecting this arm of the toggle to a body or the like. At this point the arm 9 is attached to another arm 12 by the bolt 13 and separator or washer 14. On the opposite end of the arm 12 I provide two curved faces 15 adapted to contact with and ride on the cam faces 4 before described. A housing 16 is provided inclosing these moving parts, the whole being assembled and held together by the stud 17 passing through holes 5.

The stud or bolt is provided with washer, nut and oil cap, as will be readily understood by referring to Figs. 2 and 3. A nut-equipped bolt 18 is passed through the intermediate portions of the spring arms 9 and 12, preferably at a point close to the hub 1. The object of this bolt is to bring the spring arms together, thereby regulating in part the pressure between the conical friction surfaces through a yielding member. The normal intensity of friction between the conical surfaces may be also regulated by the nut-equipped bolt 17, as will be readily understood.

With the arm 2 pivotedly attached to the axle of an automobile and the arms 9 and 12 pivotedly attached to the body, upon every relative movement of these two parts, a rotation of the members 3 and 6 will take place as will be readily understood inasmuch as the conical recess 3 is a part of hub 1 attached to arm 2, and the conical member 6 through its lug 7 engaging slot 8 of arm 9 is forced to move as a part of arms 9 and 12.

In a shock absorber of the above character, it is desirable to obtain increased frictional resistance whenever the toggle arms are given extreme movements by very intense shocks; and this is accomplished in the following manner. Under ordinary circumstances the surfaces 15 of the arm 12 ride on the low spots of the cam face 4. As the degree of rotation of the conical members is increased, due to opening or closing of the toggle arms attached to the vehicle spring the parts 15 ride up on the high spots of the cam 4 thereby drawing the conical friction surfaces together under the yielding pressure, through the arms 9 and 12. Means is provided for oiling the friction surfaces and keep the same free from dirt.

The mechanism herein illustrated and described is in the form in which I desire to construct it but any modifications may be made without departing from the salient features of my invention, and I therefore intend the following claim to cover such modifications as naturally fall within the lines of invention.

I claim:

A shock absorber comprising a pair of arms connected to act as a toggle, one of said arms provided with a hub having on one side a friction surface, on the other side a circular cam; the other of said arms being made up of a pair of laterally spaced spring metal bars, one of said bars provided with a friction surface engaging the before-mentioned friction surface, the other bar adapted to ride on the cam surface, whereby the friction surfaces are brought together with a variable yielding pressure.

This specification signed and witnessed at Faribault, Rice county, State of Minnesota, this 20th day of May, A. D. 1912.

FRIDOLIN SCHIMMEL.

In the presence of—
J. W. LE CRONE,
HENRY SCHLATTER.